(12) United States Patent
Frank et al.

(10) Patent No.: US 7,435,775 B2
(45) Date of Patent: Oct. 14, 2008

(54) TIRE WITH COMPONENT HAVING OXIRANE RESIN

(75) Inventors: Uwe Ernst Frank, Wendel (DE); Georges Marcel Victor Thielen, Schouweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/638,839

(22) Filed: Dec. 14, 2006

(65) Prior Publication Data

US 2008/0146725 A1    Jun. 19, 2008

(51) Int. Cl.
*B60C 1/00* (2006.01)
*C08K 3/34* (2006.01)

(52) U.S. Cl. ............ 524/492; 524/493; 525/331.9; 152/450

(58) Field of Classification Search ........... 524/493, 524/492; 525/331.9; 152/450
See application file for complete search history.

(56) References Cited

U.S. PATENT DOCUMENTS

| | | | | |
|---|---|---|---|---|
| 4,565,859 A | | 1/1986 | Murai et al. | 528/365 |
| 5,206,289 A | | 4/1993 | Sinsky et al. | 525/114 |
| 5,208,276 A | * | 5/1993 | Stephens et al. | 523/436 |
| 5,361,818 A | | 11/1994 | Tung et al. | 152/525 |
| 5,395,891 A | | 3/1995 | Obrecht et al. | 525/194 |
| 5,672,652 A | | 9/1997 | Corvasce et al. | 524/52 |
| 5,912,288 A | | 6/1999 | Nishimoto et al. | 524/114 |
| 6,127,488 A | | 10/2000 | Obrecht et al. | 525/333.3 |
| 6,133,364 A | | 10/2000 | Obrecht et al. | 524/495 |
| 6,207,757 B1 | | 3/2001 | Obrecht et al. | 525/194 |
| 6,242,534 B1 | | 6/2001 | Obrecht et al. | 525/191 |
| 6,372,857 B1 | | 4/2002 | Obrecht et al. | 525/332.6 |
| 6,447,867 B1 | | 9/2002 | Kominami et al. | 428/64.1 |
| 6,608,125 B2 | | 8/2003 | Cruse et al. | 524/262 |
| 6,737,466 B2 | | 5/2004 | Schaal et al. | 524/492 |
| 2003/0130535 A1 | | 7/2003 | Deschler et al. | 556/413 |
| 2005/0217782 A1 | * | 10/2005 | Agostini | 152/525 |
| 2005/0250024 A1 | * | 11/2005 | Fujimori | 430/7 |

OTHER PUBLICATIONS

Internet Article EHPE 3150, *Daicel Chemical Industries, Ltd.*, Published as early as Oct. 16, 2006.

* cited by examiner

*Primary Examiner*—Mark Eashoo
*Assistant Examiner*—Angela C Scott
(74) *Attorney, Agent, or Firm*—John D. DeLong

(57) ABSTRACT

The present invention is directed to a pneumatic tire comprising at least one component, the at least component comprising a rubber composition, the rubber composition comprising a diene based elastomer and an oxirane resin of formula I

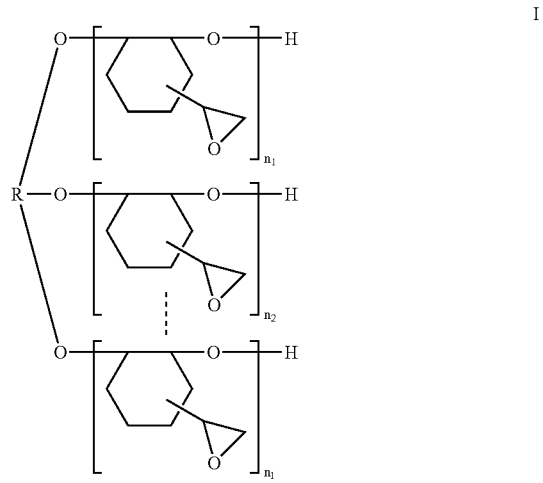

wherein R is a hydrocarbyl group and $n_1$ through $n_i$ each represent 0 or an integer of from 1 to 100 and the sum of the integers represented by $n_1$ through $n_i$ is from 1 to 100.

8 Claims, No Drawings

TIRE WITH COMPONENT HAVING OXIRANE RESIN

BACKGROUND OF THE INVENTION

There has been an increasing demand to develop tires with a high level of handling performance, good stability and steering response when changing lanes, avoiding obstacles on the road and cornering. Improved road grip without compromising stability is critical for vehicles traveling at high speed. However, higher tire operating temperatures are encountered at high speeds than are experienced during normal driving and the hot rubber in the tire becomes more pliable which reduces the handling stability of the tire, a so-called "borderline" use of said tire.

A widely adopted method to improve stability, particularly road gripping properties, is to increase the hysteresis loss of tread rubber compositions. A large hysteresis loss during the deformation of tread is used for increasing a friction force between the tread and road surface. However, a significant increase of heat buildup will occur during the running of the tires as the hysteresis loss of the tread rubber becomes large, causing wear resistance of the tread rubber to deteriorate rapidly. On the other hand, it is believed that controllability is significantly influenced by hardness (which is closely related to cornering stiffness of a tire) and breaking strength of rubber compositions. In order to enhance controllability, especially steering response, it is necessary to increase the stiffness of the tire compound in general and the tread in particular, which in most cases results in lower hysteresis loss. Therefore, it is very difficult to achieve both of these desired properties by conventional compounding techniques.

SUMMARY OF THE INVENTION

The present invention is directed to a pneumatic tire comprising at least one component, the at least component comprising a rubber composition, the rubber composition comprising a diene based elastomer and an oxirane resin of formula I

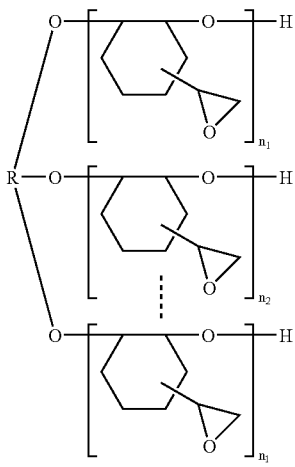

wherein R is a hydrocarbyl group and $n_1$ through $n_j$ each represent 0 or an integer of from 1 to 100 and the sum of the integers represented by $n_1$ through $n_j$ is from 1 to 100.

DETAILED DESCRIPTION OF THE INVENTION

There is disclosed a pneumatic tire comprising at least one component, the at least component comprising a rubber composition, the rubber composition comprising a diene based elastomer and an oxirane resin.

The pneumatic tire of the present invention contains at least one oxirane resin of formula I.

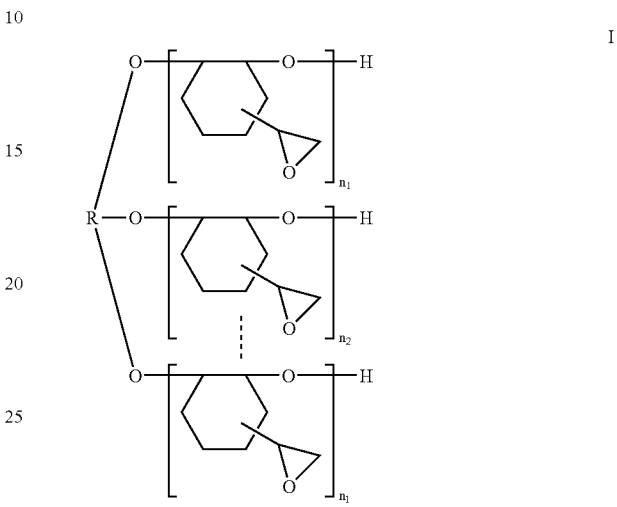

wherein R is a hydrocarbyl group and $n_1$ through $n_j$ each represent 0 or an integer of from 1 to 100 and the sum of the integers represented by $n_1$ through $n_j$ is from 1 to 100. Suitable oxirane resins of formula I may be made following the procedures disclosed in U.S. Pat. No. 4,565,859.

In one embodiment, the oxirane resin is of formula II

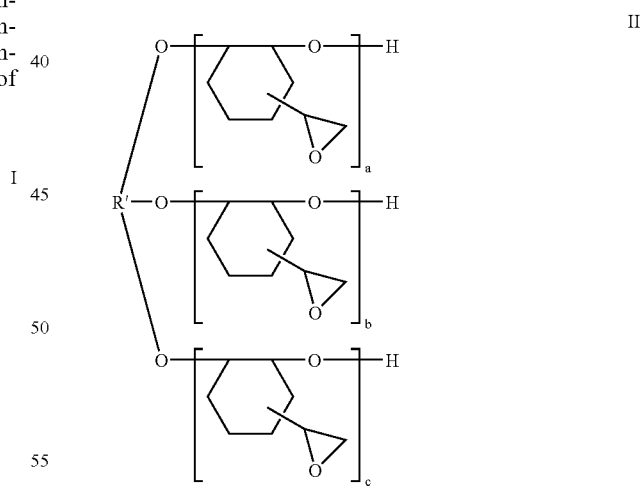

wherein R' is a linear or branched alkyl of one to ten carbon atoms, and a+b+c is approximately 15. In one embodiment, R' is of the structure

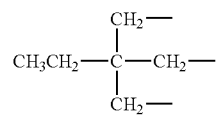

and the oxirane resin is of formula III

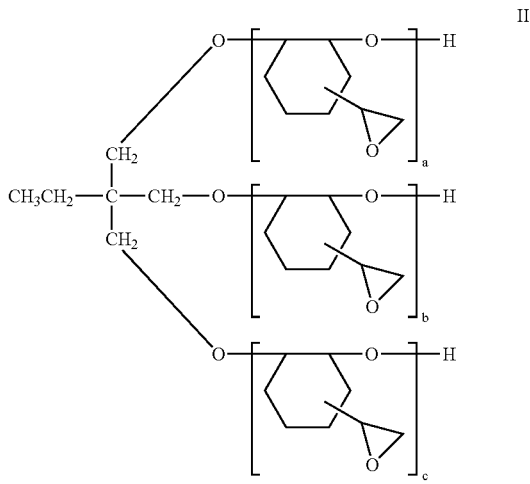

In one embodiment, the oxirane resin is EHPE 3150 available commercially from Daicel Chemical Industries. EHPE 3150 is described as a condensation reaction product of 1,2-epoxy-4-(2-oxiranyl)-cyclohexane and 2,2'-bis(hydroxymethyl)-1-butanol.

In one embodiment, the oxirane resin is present in the rubber composition in a concentration ranging from 1 to 20 parts by weight per 100 parts by weight of diene based elastomer (phr). In another embodiment, the oxirane resin is present in the rubber composition in a concentration ranging from 5 to 15 parts by weight per 100 parts by weight of diene based elastomer (phr).

The rubber composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/ dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related*

*Products* and *British Standard* 2000 *Parts,* 2003, 62nd edition, published by the Institute of Petroleum, United Kingdom.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

The rubber composition may include from about 10 to about 150 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165 MP and Z165GR and silicas available from Degussa AG with, for example, designations VN2 and VN3, etc.

The vulcanizable rubber composition may include from 1 to 100 phr of carbon black, crosslinked particulate polymer gel, ultra high molecular weight polyethylene (UHMWPE) or plasticized starch.

Commonly employed carbon blacks can be used as a conventional filler. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition may contain a conventional sulfur containing organosilicon compound. Examples of suitable sulfur containing organosilicon compounds are of the formula:

$$Z\text{-Alk-}S_n\text{-Alk-Z} \quad\quad\quad IV$$

in which Z is selected from the group consisting of

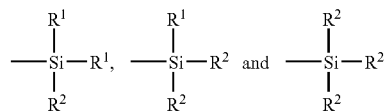

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl)tetrasulfide. Therefore, as to formula IV, Z may be

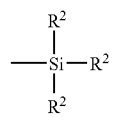

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting example.

EXAMPLE 1

In this example, the effect of adding an oxirane resin to a rubber composition is illustrated. Rubber compositions containing diene based elastomer, fillers, process aids, anti-degradants, and curatives were prepared following recipes as shown in Table 1. Sample 1 was a control, and Sample 2 was identical in composition to sample 1 except for the addition of 5 phr of oxirane resin.

The samples were tested for viscoelastic properties using RPA. "RPA" refers to a Rubber Process Analyzer as RPA 2000™ instrument by Alpha Technologies, formerly the Flexsys Company and formerly the Monsanto Company. References to an RPA 2000 instrument may be found in the following publications: H. A. Palowski, et al, *Rubber World*, Jun. 1992 and Jan. 1997, as well as *Rubber & Plastics News*, Apr. 26 and May 10, 1993.

The "RPA" test results in Table 2 are reported as being from data obtained at 100° C. in a dynamic shear mode at a frequency of 1 hertz and at the reported dynamic strain values. Tensile and hardness properties were also measured and reported in Table 2.

As seen in Table 2, addition of the oxirane resin resulted in increases in both dynamic stiffness as reflected in the G' values, and in hysteresis as reflected in the tan delta value for the inventive sample 2 as compared with control sample 1, while as the same time the hardness of the rubber and the 100% static modulus remain at the same level. Such behavior is highly unexpected and surprising, as increase in both dynamic stiffness and hysteresis is very unusual in such a comparison of rubber compounds.

TABLE 1

|  | Sample No. | |
| --- | --- | --- |
|  | control 1 | invention 2 |
| Styrene-Butadiene Rubber | 75 | 75 |
| Polybutadiene | 25 | 25 |
| Silica | 80 | 80 |
| Disulfidic silane | 12.8 | 12.8 |
| Low PCA oil | 30 | 30 |
| Wax | 1.8 | 1.8 |
| 6-PPD | 2.5 | 2.5 |
| Sulfur | 2 | 2 |
| Accelerator | 3.5 | 3.5 |
| Zinc Oxide | 2.5 | 2.5 |
| Stearic Acid | 3 | 3 |
| Oxirane resin[1], phr | 0 | 5 |

[1]EHPE 3150, reported to be the condensation reaction product of 1,2-epoxy-4-(2-oxiranyl)-cyclohexane and 2,2'-bis(hydroxymethyl)-1-butanol, available from Daicel Chemical Industries.

TABLE 2

|  | Sample No. | |
|---|---|---|
|  | 1 | 2 |
| Oxirane resin[1], phr | 0 | 5 |
| RPA, 100° C., 1 Hz | | |
| G', 1% strain (MPa) | 5.4 | 6.1 |
| G', 10% strain (MPa) | 2.9 | 3.2 |
| G', 50% strain (MPa) | 1.2 | 1.2 |
| tan delta, 10% strain | 0.152 | 0.173 |
| Shore A Hardness 23° C. | 71 | 72 |
| Ring Modulus, 23° C. | | |
| Elongations at break, % | 510 | 600 |
| Modulus 100%, MPa | 2.2 | 2.1 |
| Modulus 300%, MPa | 10.1 | 7.8 |
| Tensile Strength, MPa | 36 | 39 |

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising at least one component, the at least one component comprising a rubber composition, the rubber composition comprising at least one diene based elastomer and an oxirane resin comprising the condensation reaction product of 1,2-epoxy-4-(2-oxiranyl)-cyclohexane and 2,2'-bis(hydroxymethyl)-1-butanol.

2. A pneumatic tire comprising at least one component, the at least one component comprising a rubber composition, the rubber composition comprising at least one diene based elastomer and an oxirane resin of formula I

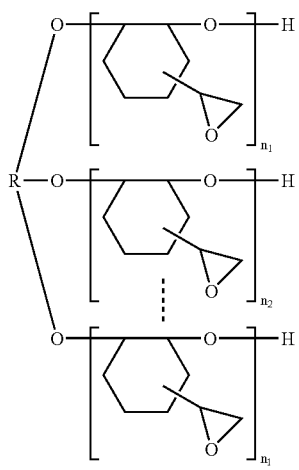

I wherein R is a hydrocarbyl group and $n_1$ through $n_l$ each represent 0 or an integer of from 1 to 100 and the sum of the integers represented by $n_1$ through $n_l$ is from 1 to 100.

3. The pneumatic tire of claim 2, wherein the oxirane resin is of formula II

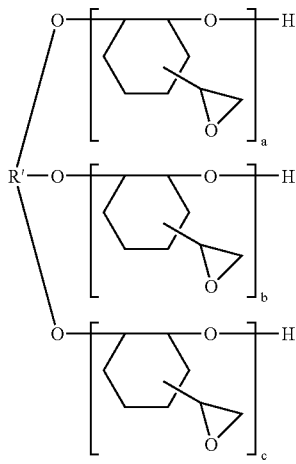

II wherein R' is a linear or branched alkyl of one to ten carbon atoms, and a+b+c is approximately 15.

4. The pneumatic tire of claim 3, wherein the oxirane resin is of formula III

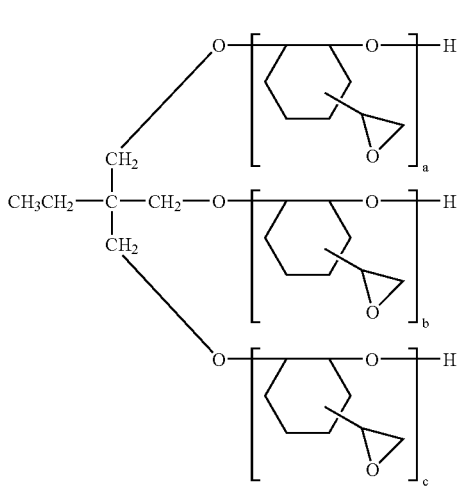

III

5. The pneumatic tire of claim 2, wherein the oxirane resin is present in the rubber composition in a concentration ranging from about 1 to about 20 parts by weight, per 100 parts by weight of elastomer (phr).

6. The pneumatic tire of claim 2, wherein the oxirane resin is present in the rubber composition in a concentration ranging from about 5 to about 15 parts by weight, per 100 parts by weight of elastomer (phr).

7. The pneumatic tire of claim 2, wherein the diene based elastomer is selected from the group consisting of cis 1,4-polyisoprene rubber (natural or synthetic), 3,4-polyisoprene rubber, styrene/isoprene/butadiene rubber, emulsion or solution polymerization derived styrene/butadiene rubbers, cis 1,4-polybutadiene rubbers and emulsion polymerization prepared butadiene/acrylonitrile copolymers.

8. The pneumatic tire of claim 2, wherein the rubber composition further comprises from about 10 to about 150 phr of silica.

* * * * *